US005600515A

United States Patent [19]
Mizuno et al.

[11] Patent Number: 5,600,515
[45] Date of Patent: Feb. 4, 1997

[54] SLIDING TYPE MAGNETIC HEAD ASSEMBLY HAVING A SPHERICAL CONTACT SURFACE OFFSET FROM A MAGNETIC POLE

[75] Inventors: Osamu Mizuno, Osaka; Tohru Nakamura, Katano; Hideki Aikoh, Higashiosaka, all of Japan

[73] Assignee: Matsushita Electric Industrial Co., Ltd., Kadoma, Japan

[21] Appl. No.: 267,876

[22] Filed: Jun. 28, 1994

[30] Foreign Application Priority Data

Jun. 30, 1993 [JP] Japan ................................ 5-160533

[51] Int. Cl.⁶ .............................. G11B 5/48; G11B 5/54; G11B 21/16; G11B 5/187
[52] U.S. Cl. .................... 360/104; 360/105; 360/110; 360/122
[58] Field of Search ..................... 360/104, 105, 360/103, 106, 114, 113, 110, 122; 369/13

[56] References Cited

U.S. PATENT DOCUMENTS

| | | | |
|---|---|---|---|
| 4,058,846 | 11/1977 | Knutson et al. | 360/121 |
| 4,167,765 | 9/1979 | Watrous | 360/103 |
| 4,734,805 | 3/1988 | Yamada et al. | 360/106 |
| 5,006,946 | 4/1991 | Matsuzaki | 360/104 |
| 5,185,683 | 2/1993 | Oberg et al. | 360/104 |
| 5,333,085 | 7/1994 | Prentice et al. | 360/104 |
| 5,347,414 | 9/1994 | Kano | 360/105 |
| 5,359,481 | 10/1994 | Egawa | 360/103 |
| 5,471,439 | 11/1995 | Katayama et al. | 360/105 |

FOREIGN PATENT DOCUMENTS

| | | |
|---|---|---|
| 0072389 | 2/1983 | European Pat. Off. . |
| 0129336 | 12/1984 | European Pat. Off. . |
| 0549144 | 6/1993 | European Pat. Off. . |
| 2-235213 | 9/1990 | Japan . |
| 1-324556 | 8/1991 | Japan . |
| 5144115 | 11/1991 | Japan . |
| 4-263148A | 9/1992 | Japan . |

OTHER PUBLICATIONS

Search Report for European Appl. 94110081.0, mailed Jan. 17, 1995.

*Primary Examiner*—Robert S. Tupper
*Assistant Examiner*—Adriana Giordana
*Attorney, Agent, or Firm*—Renner, Otto, Boisselle & Sklar

[57] ABSTRACT

A magnetic head assembly used for an information storage medium including a sliding surface according to the present invention includes a magnetic-field generation means having a magnetic pole and for giving a magnetic field to the information storage medium; a slider means coupled with the magnetic-field generation means, the slider means having a projecting portion which projects toward the information storage medium; and a load means coupled with the slider means, the load means giving a pressing force to the slider means in a direction perpendicular to the sliding surface, and pressing the projecting portion onto the sliding surface, wherein a surface of the projecting portion of the slider means includes part of one almost spherical surface.

21 Claims, 5 Drawing Sheets

SLIDING TYPE MAGNETIC HEAD ASSEMBLY HAVING A SPHERICAL CONTACT SURFACE OFFSET FROM A MAGNETIC POLE

BACKGROUND OF THE INVENTION

1. Field of the Invention

The present invention relates to a sliding type magnetic head assembly. More particularly, the present invention relates to a sliding type magnetic head assembly for use in an external memory apparatus of an electronic computer; a magnetic memory apparatus and a magneto-optical recording/reproducing apparatus, used as a recording/reproducing apparatus for music, video signals and other information.

2. Description of the Related Art

Conventionally, a magnetic head of a sliding type has been mainly used for recording on magnetic tapes and flexible magnetic disks. In recent years, a mini disk (hereinafter, referred to as "MD") has been popularized as a magneto-optical information storage medium for storing music data. The MD includes a sliding film and needs a sliding type magnetic head. The sliding type magnetic head realizes an overwrite operation by modulating magnetic fields.

Japanese Laid-Open Patent Publication No. 4-132060 discloses a sliding type magnetic head for magneto-optical recording. The magnetic head slides on a storage medium at the start and end of the disk rotation. The magnetic head includes a slider whose bottom surface is flat. The bottom surface is made of a resin having lubricative properties and excellent abrasion resistance, so as to prevent the magnetic head slider and the magneto-optical information storage medium from being abraded and damaged.

Japanese Laid-Open Patent Publication No. 55-22296 discloses a suspension applicable to the conventional magnetic head. The suspension includes a gimbal for allowing the slider to follow the surface of the rotating disk and a load beam for generating a load to press the slider on the disk.

During the process for assembling the conventional magnetic head, several problems have arisen: the first one is that the load beam and the gimbal should be welded by a spot welding, and the gimbal and the slider should be bonded together; and the second one is that a precise locational restriction between the gimbal and the slider is required to maintain their mechanism, and also between the slider and the load beam via the gimbal to maintain the locational precision of a magnetic core.

Thus, the fabrication of the gimbal is extremely costly because it requires precise processing, resulting in a rise in the cost of the magnetic head assembly. Furthermore, the load beam requires a bending process for producing a rigid part and precise control of the deformation process to provide an appropriate load, also resulting in a rise in the cost of the magnetic head assembly.

SUMMARY OF THE INVENTION

A magnetic head assembly used for an information storage medium including a sliding surface according to the present invention includes a magnetic-field generation means having a magnetic pole and for giving a magnetic field to the information storage medium; a slider means coupled with the magnetic-field generation means, the slider means having a projecting portion which projects toward the information storage medium; and a load means coupled with the slider means, the load means giving a pressing force to the slider means in a direction perpendicular to the sliding surface, and pressing the projecting portion onto the sliding surface, wherein a surface of the projecting portion of the slider means includes part of a spherical surface.

In one embodiment of the invention, the load means includes: a fixing part for fixing the load means to a body separated from the information storage medium; a load generation part for generating the pressing force in a direction substantially perpendicular to the sliding surface; and a rigid part made of a substantially rigid material, wherein the fixing part, the load generation part, the rigid part, and the slider means are connected in this order substantially in series, and a direction from the fixing part to the slider means is substantially parallel to a sliding direction.

In another embodiment of the invention, the slider means and the rigid part of the load means are integrally formed of the same resin material.

In still another embodiment of the invention, the load generation part of the load means is an elastic body of a substantially flat plate shape without any external force; and the elastic body is elastically deformed so as to have a convex shape toward the sliding surface of the information storage medium, and coupled between the rigid part and the fixing part of the load means, thereby giving an elastic force of the elastic body to the projecting portion as a pressing force.

In still another embodiment of the invention, the elastic body is a metallic blade spring of a flat-plate shape.

In still another embodiment of the invention, the elastic body includes: a first attachment part to be attached to the rigid part; and a second attachment part to be attached to the fixing part, wherein the state of the elastic body when giving a standard pressing force to the projecting portion is defined as a standard deformation state, and in the case where an angle formed by a contact plane of the first attachment part and a contact plane of the second attachment part in the standard deformation state is θ, the sliding surface in the standard operation state is defined as a reference plane; and the first attachment part is attached to the rigid part at an angle of approximately θ/2 from the reference plane in the standard operation state, and the second attachment part is attached to the fixing part at an angle of approximately −θ/2 from the reference plane in the standard operation state. SO In still another embodiment of the invention, the rigid part and the fixing part are made of a resin material and the elastic body is made of a metallic blade spring of a flat-plate shape; a rigid-part attachment face of almost e flat plane is provided on the rigid part for fixing the first attachment face, the rigid-pert attachment face formed with an angle of approximately θ/2 from the reference plane; a fixed-part attachment face of almost a plan shape is provided on the fixing part for fixing the second attachment face, the fixed-part attachment face formed with an angle of approximately −θ/2 from the reference plane; and the metallic blade springs are respectively attached to the rigid-part attachment face and the fixed-part attachment face by a resin rivet means such as an ultrasonic resin fusion.

In still another embodiment of the invention, the fixing part has a bottom surface being almost parallel to the sliding surface in the standard state, the bottom surface facing the sliding surface in the vicinity of the elastic body; and at least in the standard operation state, the first attachment part and the second attachment part are appropriately located so that the point on the elastic body which is closest to the sliding surface does not project from the bottom surface in the side of the fixing part.

In still another embodiment of the invention, the load generation part is a metal spring; the slider part, the rigid part, and the fixing part are made of a resin material; and the load generation part is formed between the rigid part and the fixing part by insert or outsert forming process.

In still another embodiment of the invention, the load generation part is a spring made of a resin material; the slider part, the rigid part, and the fixing part are made of a resin material; and the load generation part, the slider part, and the rigid part are integrally formed.

In still another embodiment of the invention, a metal wire is formed in the load generation part by insert or outsert forming process, whereby the two members are integrally formed.

In still another embodiment of the invention, the load generation part has a configuration in which a metal wire is formed by insert or outsert forming process in a hinge structure formed of a resin material; the slider part, the rigid part, and the fixing part are made of a resin material; and the load generation part, the slider part, the rigid part, and the fixing part are integrally formed.

In still another embodiment of the invention, the information storage medium is of a disk shape; and the location of the bottom surface of the magnetic pole on a virtual plane including the bottom surface of the magnetic pole is outside a contact region where the projecting portion of the slider means and the sliding surface of the information storage medium can be in contact with each other during operation, and inside a crossing region where the virtual plane and the sliding surface can cross with each other.

In still another embodiment of the invention, the magnetic pole is provided in the side of a radially outward position of the information storage medium rather than the projecting portion.

In still another embodiment of the invention, a radius of almost a spherical surface of the projecting portion is approximately 10 mm, and an amount of projecting of the projecting portion is approximately 50 μm; and the magnetic pole is located in a range of approximately 0.4 mm to approximately 1.4 mm along a radius direction of the information storage medium from a peak of the projecting portion in the side of an radially outward position of the information storage medium.

In still another embodiment of the invention, the arm part is extended substantially along a sliding direction from the fixing part, and a hook part is provided on a tip end of the arm part; the hook part is located between the rigid part and the sliding surface, when the projecting portion is in contact with the information storage medium while the magnetic head assembly operates; the hook part does not come into contact with any part excluding the fixing part; and the hook part comes into contact with the rigid part by the pressing force generated by the load generation part while the projecting portion is apart from the sliding surface.

In still another embodiment of the invention, the hook part is formed of a stick or a plate-shaped member which is almost parallel to the sliding surface and extends in a direction substantially perpendicular to a sliding direction.

In still another embodiment of the invention, the location of the bottom surface of the magnetic pole on a virtual plane including the bottom surface of the magnetic pole is outside e contact region where the projecting portion of the slider means and the sliding surface of the information storage medium can be in contact with each other during operation, and inside a crossing region where the virtual plane and the sliding surface can cross with each other.

In still another embodiment of the invention, a location of the slider part is limited to a limited space which does not include the information storage medium, the space being one of two spaces divided by an inner envelop of a group of planes which is formed by the sliding surface.

In still another embodiment of the invention, when a plane including the sliding surface during operation is denoted as a plane $D_0$, and planes apart from the sliding surface are denoted as planes $D_1$ to $D_n$, respectively depending on a distance of $d_1$ to $d_n$ from the plane $D_0$, the respective planes $D_1$ to $D_n$ and the curved surface having an angle error form crossing lines $C_1$ to $C_n$; planes of the slider part each facing the sliding surface are planes $S_1$ to $S_n$ depending on a distances $d_1$ to $d_n$ from the plane $D_0$; and a range of each plane Si is limited within the corresponding crossing line Ci.

In still another embodiment of the invention, a contact portion formed when the projecting portion comes into contact with the information storage medium is a single region excluding any straight line or concave portions on a boundary thereof.

Thus, the invention described herein makes possible the advantage of providing a magnetic head assembly which can be easily fabricated with low cost.

According to the present invention, a magnetic head assembly having the following notable advantages can be provided.

First, since a projecting portion of a slider part is of a spherical-surface shape, a conventional rotating means such as a gimbal is not necessary, even if a disk is inclined.

Moreover, a rigid part and the slider part do not require a metal bending process, a bonding process, and the like, since they are integrally formed.

Furthermore, since an elastic body is of a flat-plate shape and fixed on a slope, a conventional bending process is not required for the elastic body, resulting in a great reduction in cost.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

FIGS. 1 to 7 show an exemplary magnetic head assembly according to the present invention. In each figure, a right-handed rectangular coordinate system is defined, for convenience, as follows:

A positive x-axis direction and a negative x-axis direction are referred to as a front direction and a rear direction, respectively; a positive y-axis direction and e negative y-axis direction are referred to as a right direction and a left direction, respectively; end a positive z-axis direction and a negative z-axis direction are referred to as an upward direction and a downward direction, respectively.

In this example, a magneto-optical disk 1 is used as an information storage medium having a sliding surface.

Figure 7:
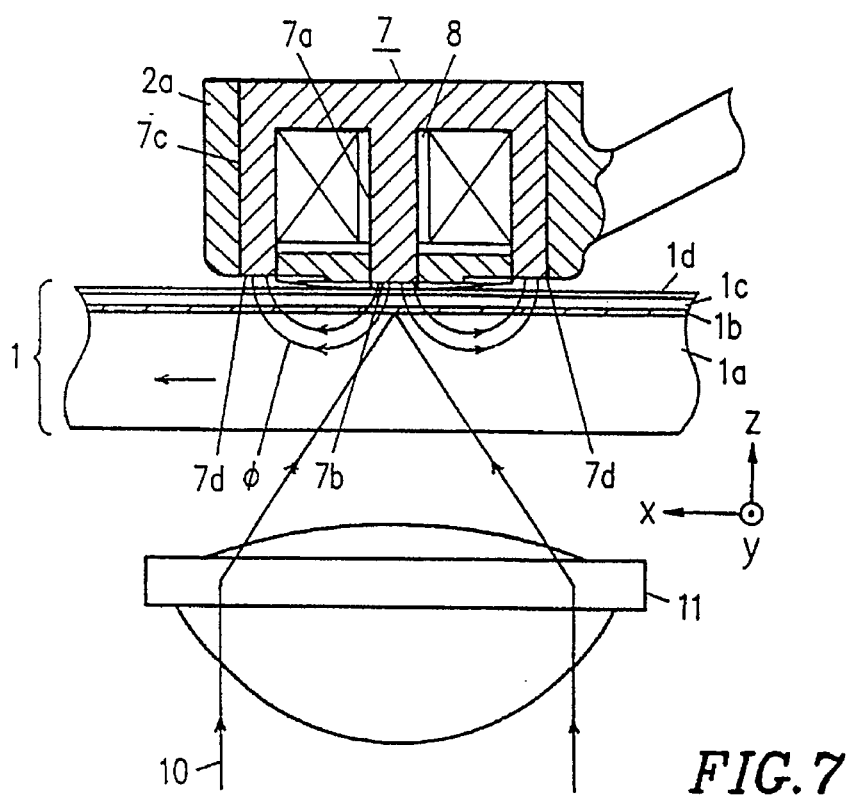
FIG. 7 is a sectional side view showing the recording operation of a magnetic head in one example.

The magneto-optical disk 1, for example as shown in FIG. 7, includes a Transparent substrate 1a made of a plurality of layers such as polycarbonate, a recording layer 1b made of a film magnetized vertically, a protection layer 1c made of a resin or the like, and a sliding film 1d for reducing any frictional force between a slider end the disk 1. The magneto-optical disk 1 is also provided with a multiple number of concentric or a spiral recording track formed thereon with their center at its rotation axis (not shown).

Figure 1A:
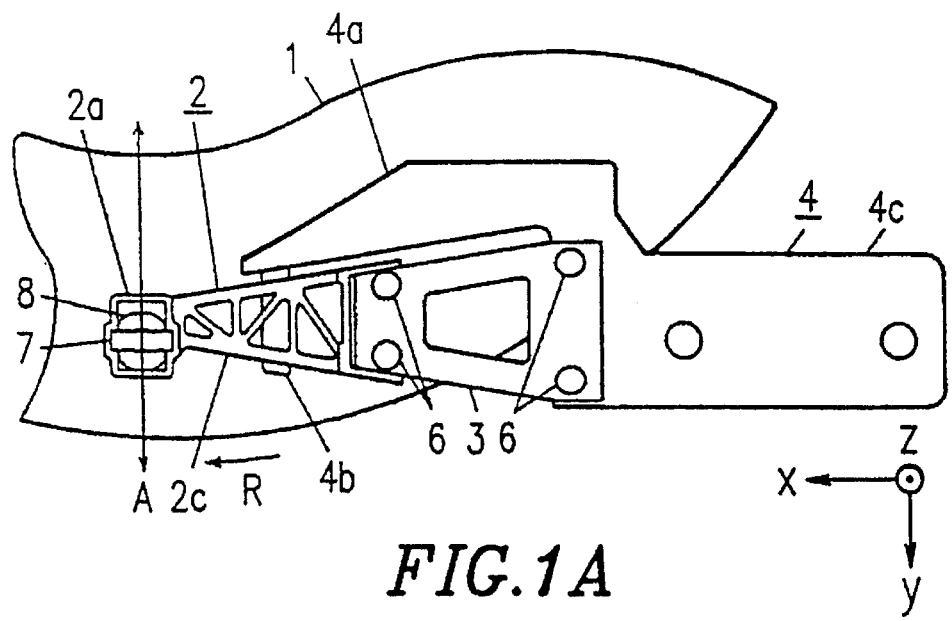
FIG. 1A is plan view of a magnetic head assembly in one example according to the present invention.

Hereinafter, this example will be described with reference to FIGS. 1A, 1B, and 1C. The main axis of the magnetic head assembly is parallel to the x-axis as shown in FIG. 1A. The track (not shown) of the magneto-optical disk 1 is also parallel to the x-axis at the point where the magnetic head assembly is in contact with the magneto-optical disk 1 (i.e., a contact point). When a tangential direction of the magneto-optical disk 1 at the contact point coincides with the main axis of the magnetic head assembly, this arrangement is generally referred to as an in-line arrangement. In this example, the magneto-optical disk 1 rotates in a direction of the arrow R shown in FIG. 1A, and the magnetic head assembly performs a seek operation together with an optical head (not shown) in the direction of the arrow A.

The magnetic head assembly includes a slider assembly 2 made of a resin and a fixing plate 4. The slider assembly 2 is connected to the fixing plate 4 via a blade spring 3 made of metal such as a stainless steal sheet. The blade spring 3 has a function of a load means to press the slider assembly 2 on the sliding film 1d of the magneto-optical disk 1 in a substantially vertical direction.

The slider assembly 2 includes a slider part 2a at the end thereof in the positive x-axis direction, and a rigid part 2c unified into the slider part 2a. The slider part 2a is provided with a coil 8 and a magnetic core 7 on which the coil 8 is wound. The slider part 2a has a protecting portion on its bottom surface facing the magneto-optical disk 1. The projecting portion has a spherical surface 2b (radius: 10 mm). The rigid part 2c is partially bored into a truss structure, as shown in FIG. 1A, so as to lighten the weight while maintaining its rigidity. The slider assembly 2 is made of a resin, and the slider part 2a, the spherical surface 2b and the rigid part 2c are integrally formed of the resin.

The blade spring 3 is made of a material which makes the spring 3 as flat without any external force. The blade spring 3 is attached on slopes 5 provided on the slider assembly 2 and the fixing plate 4, respectively, by resin rivets 6. The resin rivet 6 joints respective members with an ultrasonic fusion or the like. The blade spring 3 is sufficiently wide in the y-axis direction and thin in the z-axis direction. Therefore, the blade spring 3 can be deformed due to its moment around the y-axis. Accordingly, the blade spring 3 provides the slider part 2a with a freedom of motion only in the z-axis direction.

The fixing plate 4 includes a fixing part 4c and an arm part 4a extended from the fixing part 40, the fixing part 4c being employed for mounting the magnetic head assembly in the optical head (not shown). The arm part 4a is formed on the right side of the blade spring 3 in the direction from the rear side to the front side (i.e., from the negative x-axis direction to the positive x-axis direction), and extends to the right side of the rigid part 2c, as shown in FIG. 1A. A hook part 4b is provided in the vicinity of a tip end of the arm part 4a, and almost parallel to the y-axis. As is shown in FIG. 1B, in a state that the spherical surface 2b of the slider part 2a is down on the magneto-optical disk 1, the hook part 4b is located between the rigid part 2c and the magneto-optical disk 1, so that the hook part 4b does not come into contact with the rigid part 2c nor the magneto-optical disk 1 at all. Moreover, in this state, the blade spring 3 has a force to deform its flat-plate shape and to return again into the flat-plate shape. The slopes 5 are located in the z-axis direction so that the bottom end of the blade spring 3 does not project from the bottom surface of the fixing part 4c in this deformation state.

Figure 2A:
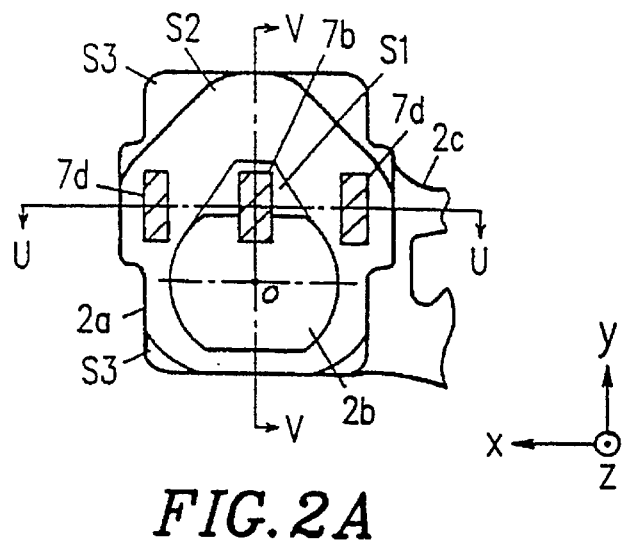
FIG. 2A is a bottom view of a principle slider part in one example according to the present invention.
Figure 2B:
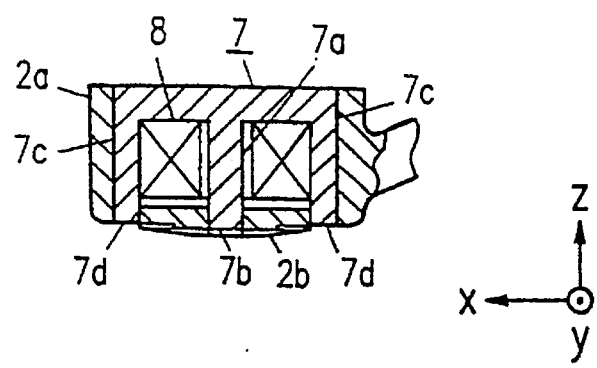
FIG. 2B is its cross sectional view taken along a line U—U.
Figure 2C:
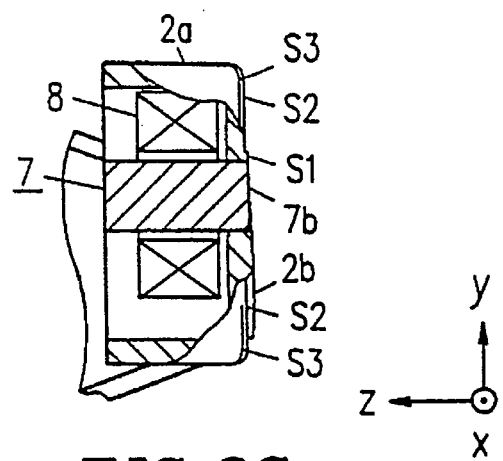
FIG. 2C is its partial cross-sectional view taken along a line V—V.

Hereinafter, the slider part 2a will be described in detail with reference to FIG. 2A, 2B, and 2C. The magnetic core 7 includes a center yoke 7a and two side yokes 7c, as shown in FIG. 2B. The cross section of the magnetic core 7 is formed in a shape similar to an alphabetic "E". The center yoke 7a is wound with the coil 8. When a current flows through the coil 8, the center yoke 7a and each of the side yokes 7c form a magnetic circuit, respectively, as shown in FIG. 7. The center yoke 7a and the side yokes 7c are exposed downward from the bottom surface of the slider part 2a to oppose the magneto-optical disk 1. Respective exposed surfaces of the center yoke 7a and the side yokes 7c are referred to as a center yoke top 7b and side yoke tops 7d, respectively (see FIG. 2A).

As is shown in FIG. 7, the optical head includes at least a light source of a laser beam 10 and an objective lens 11 for converging the laser beam 10 into the recoding layer 1b. The magnetic head assembly is connected to the optical head by the fixing part 4c, so that a location where the laser beam 10 is converged is located Just under the center yoke top 7b.

Next, a preferable configuration of the bottom part of the slider part 2a will be described in detail. The bottom part of the slider part 2a is configured in view of a possibility that the surface of the magneto-optical disk 1 is inclined in accordance with the rotation. Initially, the configuration of the bottom part of the slider part 2a will be explained in detail. As is shown in FIG. 2C, the peak 0 of the spherical surface 2b projects downward from a plane S1 including the center yoke top 7b. In this example, the amount of projecting is 50 μm. Here, the plane S1 is a virtual plane including the center yoke top 7b, which is parallel to the x-y plane and indefinitely expands in the x-y direction. A plane S2 includes the side yoke tops 7d and is parallel to the plane S1. A plane S3 includes the bottom surface of the slider part 2a and is parallel to the plane S1. The planes S1, S2, and S3 are defined by a distance from the peak 0 of the spherical surface 2b (i.e., the shift from the peak 0 in the z-axis direction). In this example, the plane S1, the plane S2, and the plane S3 are apart from the peak 0 in the upward direction by 50 μm, 100 μm, and 150 μm, respectively. The side yoke tops 7d are located upward the center yoke top 7b by 50 μm.

Figure 3:
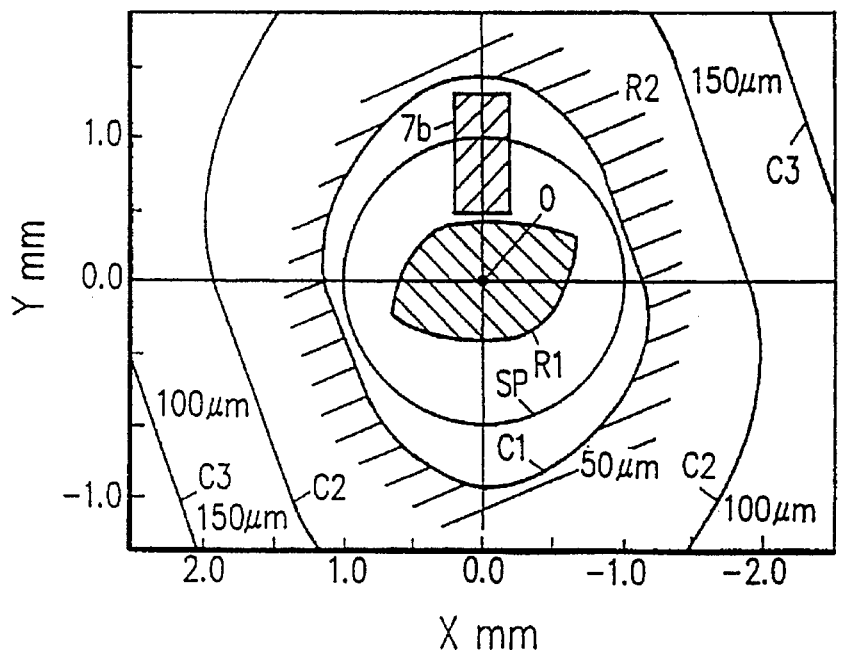
FIG. 3 is a nomogram for configuring a slider part according to the present invention.

FIG. 3 shows an arrangement of the center yoke top 7b and the slider part 2a. This figure shows the x-y plane whose origin is the peak 0 of the spherical surface. The coordinate axes in FIG. 3 correspond to those of other figures. On the x-y plane of FIG. 3, a curve and the like, which are obtained by simulation, are shown.

According to this example, the spherical surface 2b of the slider part 2a is in contact with the sliding film 1d of the magneto-optical disk 1 at a small point. Since the sliding film 1d has a certain degree of elasticity, the contact point between the spherical surface 2b and the sliding film 1d has a limited area. When the pressing force is approximately 6 mN, the contact point has a diameter in the range of about 0.05 to 0.1 mm.

When the spherical surface 2b and the sliding film 1d are in contact with each other at the origin of the x-y plane, the plane S1 and the sliding film 1d become parallel to each other. In this specification, this state is referred to as "a standard operation state". However, when the magneto-optical disk 1 is inclined to the slider assembly and therefore the spherical surface 2b and the sliding film 1d come into contact with each other at a different point, the virtual plane S1 and the sliding film 1d cross with each other. As a result, the crossing line is formed on the virtual plane S1. As an inclination angle formed by the magneto-optical disk 1 and the plane S1 changes in accordance with rotation of the magneto-optical disk 1, a series of points on the x-y plane, which are projections of the contact point between the spherical surface 2b and the sliding film 1d, are shifted from the origin on the x-y plane. In this case, a crossing line between the plane S1 and the sliding film 1d is also shifted on the plane S1.

In FIG. 3, a region R1 shows a locus of moving points which are projections of the contact point between the spherical surface 2b and the sliding film 1d. The region R1 coincides with the origin O if in an ideal state. However, in reality, the region R1 has a peculiar shape and expanse as shown in the figure, because of fluctuation and inclination of the magneto-optical disk 1 while rotating, or assemblage errors for the magnetic head assembly. When the contact point between the sliding film 1d and the spherical surface 2b moves within the region R1, the crossing line of the plane S1 and the sliding film 1d draws a curve on the plane S1. On the x-y plane, a closed curve C1 is a projection of an inner envelop line formed by a group of virtual crossing lines of the sliding film 1d and the plane S1. While the magneto-optical disk 1 rotates, the crossing line never invades within the curve C1. A region outside the curve C1 is referred to as a region R2. On the x-y plane, a curve SP is a projection of the crossing line of the spherical surface 2b and the plane S1.

Since the region R1 is a region where the spherical surface 2b is in contact with the sliding film 1d, the center yoke top 7b cannot be located within the region R1. When being on the plane S1 and located in the region R2, i.e., a region outside the curve C1, the center yoke top 7b inevitably comes into contact with the sliding surface 1d. Accordingly, the center yoke top 7b should be located outside the region R1 and inside the region R2. FIG. 3 shows a possible location of the center yoke top 7b.

As is shown in FIG. 3, according to this example, a region off-set from the origin O along the y-axis, i.e., e region, off-set on the radially inward position or the radially outward position, of the magneto-optical disk 1, along the radial direction thereof, has the largest area to include the center yoke top 7b. Accordingly, the center yoke top 7b can be located in two manners, i.e., on the radially inward position or on the radially outward position of the origin O of the spherical surface 2b. However, in the case where the magneto-optical disk 1 is a mini disk (MD), a recording region extends to the outermost circumference of the disk. Thus, it is necessary to locate the center yoke top 7b in the outermost circumference of the disk. In this case, the spherical surface 2b should be located on the radially inward position of the magneto-optical disk 1, compared with the location of the center yoke top 7b. In other words, the center yoke top 7b should be located on the radially outward position ( y-coordinate: positive region) of the magneto-optical disk 1, as shown in FIG. 3.

It is preferable that the center yoke top 7b is generally long enough in the y-axis direction to cover a tracking range of an actuator for the objective lens 11. In addition, it is preferable that the center yoke top 7b is located in the vicinity of the origin O which is a standard contact point.. The reason is that the shift in the distance, which is e distance in the z-axis direction, between the center yoke top 7b and the recording layer 1b becomes smaller as the distance between the center yoke top 7b and the origin O is smaller, when the magneto-optical disk 1 is inclined. In this case, a stable recording operation can be performed. Accordingly, it is optimum that the center yoke top 7b is located as shown in FIG. 3. The simulation based on this arrangement has revealed that a range of shift in the distance between the center yoke top 7b and the recording layer 1b can be maintained at approximately ±60 μm under the worst condition. FIG. 3 also shows that the center yoke top 7b can be located in a zone of 0.4 mm to 1.4 mm from the peak 0 of the spherical surface 2b (i.e., origin O).

The inclined sliding film 1d draws a locus of almost 8 conical-surface shape (i.e., "a sliding curve") in accordance with rotation of the magneto-optical disk 1. In FIG. 3, the curve C1 is a curve (which is projected on the x-y plane) formed by crossing of the sliding curve face and a plane which is 50 μm apart from the origin O in the upward direction. The curve C1 is a kind of a contour line drawn on the sliding curve. Similarly, e curve C2 and a curve C3 ere a kind of contour line apart from the origin O at 100 μm and 150 μm, respectively. Accordingly, the slider part 2a shown in FIG. 2 should be configured so that the plane 81 is located within the curve C1, and the planes S2 and S3 are located within the curves C2 and C3, respectively. Due to this locational relationship, the bottom part of the slider part 2a can be prevented from being in contact with the sliding surface 1d.

With respect to the invention that the slider assembly 2 is in contact with the sliding surface 1d of the magneto-optical disk 1 by means of the spherical surface 2b thereof, the above-mentioned design method shown in the diagram of FIG. 3 is extremely useful.

Figure 4:
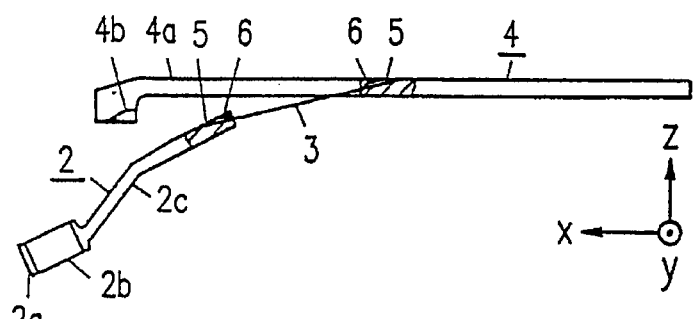
FIG. 4 is a partial cross-sectional view showing a virtual assemblage of a magnetic head assembly in one example.
Figure 5:
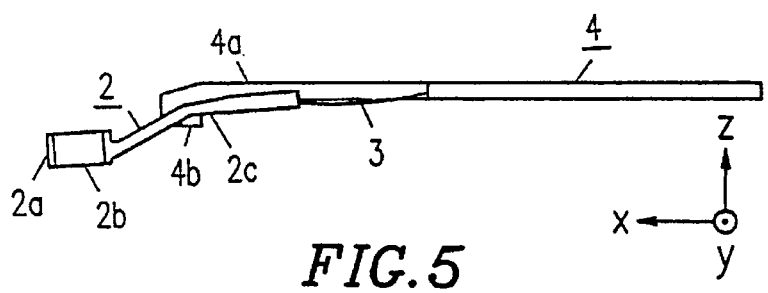
FIG. 5 is a side view showing an assemblage of a magnetic head assembly in one example.

FIG. 4 is a side view showing a state of virtual assemblage of the magneto-optical disk 1. As is shown in the figure, in the case where the slider assembly 2, the blade spring 3, and the-fixing plate 4 are assembled without using the hook part 4b, the blade spring 3 becomes flat with no external force, and the slider part 2a is shifted downward in accordance with inclination of the slope 5. On the other hand, FIG. 5 is a side view showing a state of real assemblage of the magneto-optical disk 1. In this case, the blade spring 3 is elastically deformed, so that the hook part 4b is in contact with the rigid part 2c. Accordingly, the slider part 2a is not so shifted downward with no external force, compared with the state as shown in FIG. 4.

Figure 1B:
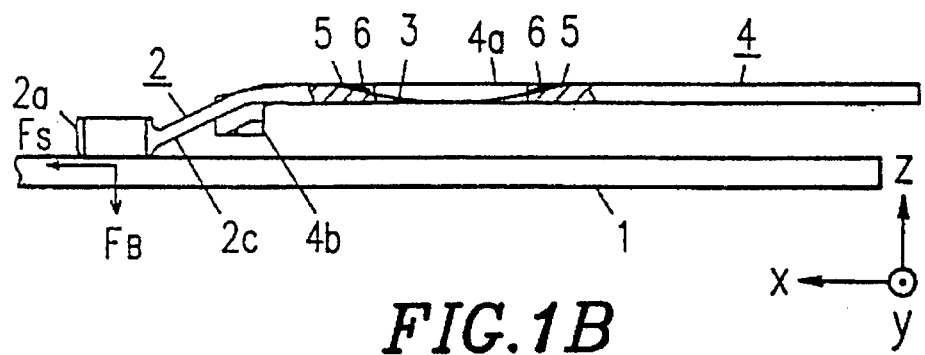
FIG. 1B is its partial cross-sectional side view.
Figure 1C:
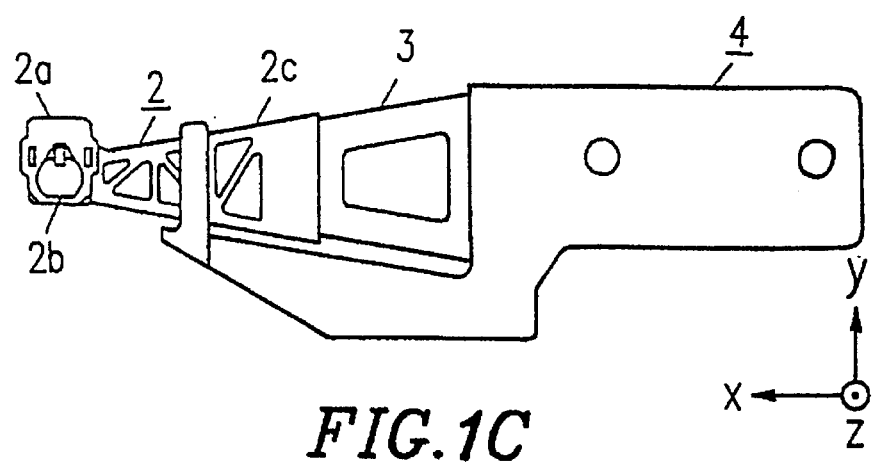
FIG. 1C is its bottom view.

FIG. 1B shows a state where the blade spring 3 provides the slider part 2a (projecting portion 2b) with a standard pressing force. In this specification, this state is referred to as "a standard deformation state". In this standard deformation state, an angle formed by the slope 5 provided on the rigid part 2c and the slope 5 provided on the fixing plate 4 is $\theta$ or $\pi-\theta$ ($\theta \leq \pi-\theta$). In this example, the slope 5 of the rigid part 2c is arranged so as to have an angle of approximately $\theta/2$ from the standard plane in the standard operation state. On the other hand, the slope 5 provided on the fixing plate 4 is arranged so as to have an angle of approximately $-\theta/2$ from the standard plane in the standard operation state. Due to these arrangements, an effect can be obtained, such that the amount of projection of the blade spring 3 in the z-axis direction becomes almost minimum, resulting in a thinner configuration of the device. However, these angles can be set to be appropriate values in view of elasticity of the blade spring 3.

Figure 6:
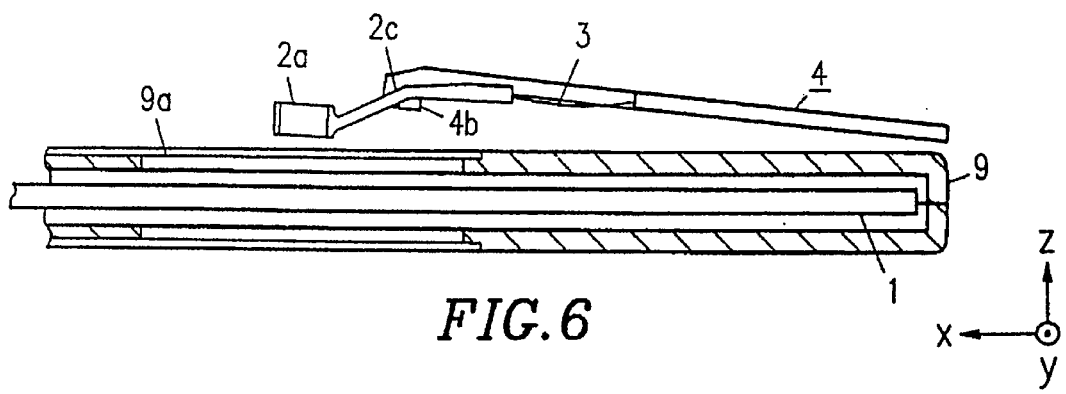
FIG. 6 is a side view of a magneto-optical disk built in a cartridge in one example.

FIG. 6 is a diagram for explaining a case in which the magneto-optical disk 1 is held in a cartridge. In this figure, the reference numeral 9 denotes a cartridge, and 9a a window provided in the cartridge 9 so as to make the slider part 2a approach the magneto-optical disk 1.

Hereinafter, the operation of the magnetic head assembly configured in the above manner will be described with reference to FIGS. 5 and 7.

Initially, when the spherical surface 2b of the magnetic head assembly, as shown in FIG. 5, is let down on the sliding film 1d of the magneto-optical disk 1 while rotating in the direction of the arrow R (see FIG. 1A), the rigid part 2c comes apart from the hook part 4b, whereby the blade spring 3 is deformed to have a configuration as shown in FIG. 1B. Since the slider part 2a is positioned as shown in FIG. 4 if no external force is applied, a sufficient pressing force $F_B$ (=amount of the shift of the slider part 2a×the spring constant of the blade spring 3) acts on the spherical surface 2b via the rigid part 2c and the slider part 2a.

Then, a frictional force $F_S$ due to the pressing force $F_B$ acts between the spherical surface 2b and the sliding film 1d in the direction as shown in FIG. 1B. In this case, the frictional force $F_S$ becomes a tensile force to the fixing part 4c. Therefore, the blade spring 3 is not buckled and the slider part 2a can stably operate.

The hook part 4b does not come into contact with the magneto-optical disk 1 after getting apart from the rigid part 2c, whereby the hook part 4b does not disturb the operation of the magneto-optical disk 1. Moreover, the bottom end of the deformed blade spring 3, as shown in FIG. 1B, does not project from the bottom surface of the fixing part 4c.

FIG. 7 shows a recording operation of the magnetic head. In this operation, the laser beam 10 is focused on a recording track of the recording layer 1b by the objective lens 11. When a current flows through the coil 8, magnetic fluxes $\phi$ are generated in the magnetic core 7 made of ferrite. Assuming that the current flows so that the negative direction of the z-axis becomes the N-pole, the magnetic fluxes $\phi$ are generated between the center yoke top 7b and each of the side yoke tops 7d as shown in FIG. 6. A sufficient number of magnetic fluxes $\phi$ for recording pass through the recording layer 1b in the vicinity of the center yoke top 7b.

In the recording layer 1b in the vicinity of the center yoke top 7b, temperature is raised by irradiation of the focused laser beam 10, resulting in a lower magnetic coercive force. Thus, the direction of magnetization follows the direction of the magnetic flux $\phi$ and the direction of magnetization is maintained after the temperature is lowered, thereby terminating the recording operation. In this state, when the current flowing through the coil 8 is modulated in accordance with information to be recorded, the information is recorded in the recording layer 1b as a magnetization pattern.

The slider part 2a has a freedom of motion only in the almost z-axis direction. However, even though the magneto-optical disk 1 is inclined, the spherical surface 2b can be always stably in contact with the magneto-optical disk 1. The sliding film 1d is in contact with the spherical surface 2b only in the region R1 as shown in FIG. 3, and does not come into contact with other parts of the slider part 2a nor the center yoke top 7b.

Furthermore, in the case where the magneto-optical disk 1 has the cartridge 9 as shown in FIG. 6, the magnetic head assembly should rotate around the y-axis, so that the slider part 2a is ejected from the window 9a. In this case, the rigid part 2c is hung from the hook part 4b, so that the slider part 2a is lifted. If the slider assembly 2 does not include the hook part 4b, the fixing plate 4 should be greatly rotated around the y-axis so as to lift the slider part 2a. The rotation or shift of the magnetic head assembly while the slider part 2a is ejected greatly effects the size of the device. Thus, the hook part 4b is very effective for providing a thin device.

As is mentioned above, it is the spherical surface 2b that is in contact with the sliding film 1d of the magneto-optical disk 1. As a result, different from the conventional magneto-optical disk, the present invention can avoid the provision of e gimbal. Moreover, the slider assembly 2 includes the slider part 2a and the rigid part 2c which are integrally formed of a resin, thereby omitting a bending process which is necessary for a conventional rigid metal part.

Furthermore, by providing the slope 5 in the slider assembly 2, an inexpensive flat-plate shaped blade spring 3 can be employed in place of a conventional spring member which is made by a precise bending process. As is shown in FIG. 1B, the heights of the slopes 5 are set so that the bottom end of the blade spring 3 does not project from the fixing part 4c when it is deformed during operation. Thus, when the cartridge 9 is used, a clearance with the cartridge 9 can be set to be small, resulting in a smaller-sized device.

By virtue of the hook part 4b, the amount of lifting of the magnetic head assembly can be restrained, greatly contributing to compactness of the device.

Since the slider assembly 2 end the fixing plate 4 are made of a resin, the complicated members such as the slider part 2a, the spherical surface 2b, the slope 5, and the hook part 4b can be extremely easily fabricated at low cost. Moreover, a method using the rivet 6 performed by a resin fusion process can be employed in place of a conventional spot welding, thereby reducing cost and increasing reliability.

Since the spherical surface 2b projects from the center yoke top 7b at the predetermined amount in an optimum configuration system as shown in FIG. 3, the sliding film 1d does not come into contact with the center yoke top 7b nor portions other than the spherical surface 2b, although the slider part 2a merely has a freedom of sliding in the z-axis direction. Accordingly, the sliding film 1d can be prevented from being damaged. Furthermore, the shift in location of the center yoke top 7b and the recording layer 1b can be restrained to the minimum.

In this example, uniting the slider assembly 2 and the fixing plate 4 via the blade spring 3 is performed with the resin ultrasonic diffusion method using the rivets 6. However, these three members can be united by insert or outsert forming process. In this case, more reliability can be obtained in fixing the members together.

Furthermore, the blade spring 3 is used as a means for generating the pressing force. However, if the pressing force can be small, a resin spring may be made of the same resin material as that of the slider assembly 2 end the fixing plate 4. In this case, the device can be integrally fabricated without jointing process, resulting in e great reduction in cost order to avoid a creep phenomenon, the slider assembly 2, the fixing plate 4, and the blade spring 3 can be united by insert or outsert forming process using a metal wire as an elastic body.

It is also possible that a means for generating the pressing force, such as a metal wire, is united into a hinge assembly by insert or outsert forming process, the hinge assembly being formed of the same resin material as that of the slider assembly 2 and the fixing plate 4.

Figure 8:
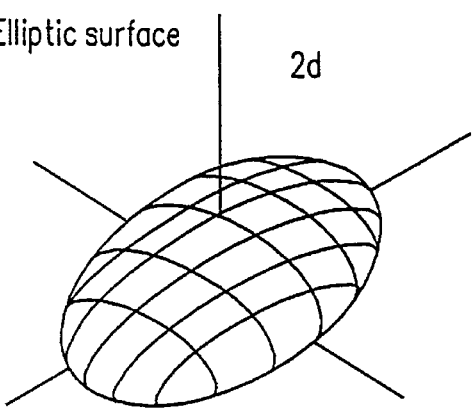
FIG. 8 is a perspective view showing an ellipsoid projecting portion of a magnetic head according to the present invention.

In this example, the spherical surface 2b is used as the projecting portion. However, other surfaces such as an ellipsoid 2d shown in FIG. 8 may be used.

Figure 9A:
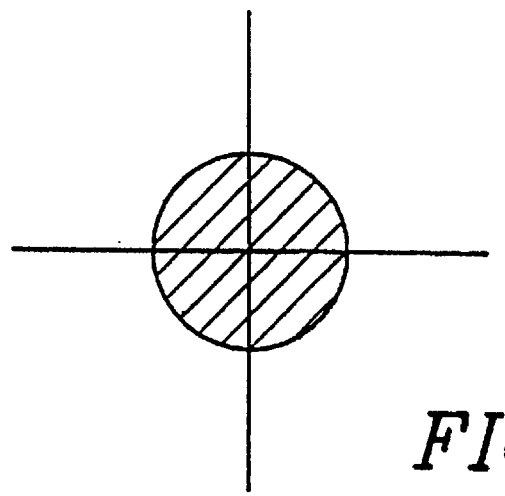
FIG. 9A is a plan view showing the shape of a contact point between a disk and a projecting portion of a spherical surface of a magnetic head according to the present invention.
Figure 9B:
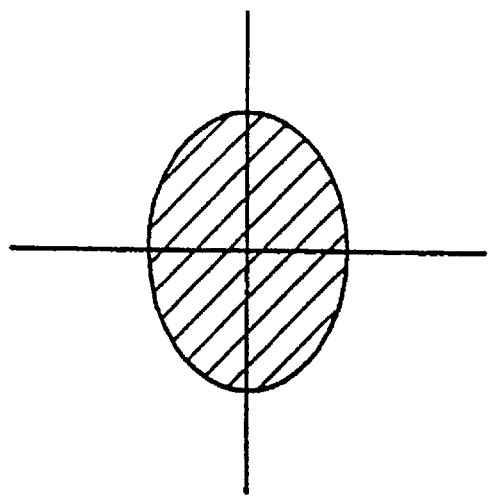
FIG. 9B is a plan view showing a shape of a contact point between the disk and an ellipsoid projecting portion of the magnetic head.

The projecting portion is elastically deformed by its contact with the sliding film 1d and the contact point has a certain area. This area is referred to as a contact point, and the shape of the contact point is defined as a contact point shape. In the case where the projecting portion is the spherical surface 2b, the contact point shape becomes a circle as shown in FIG. 9A. Alternatively, in the case where the projecting portion As the ellipsoid 2d, the contact point shape becomes an ellipse as shown in FIG. 9B. In the present specification, "spherical surface" means the boundary of the contact point shape, which does not include any straight light portion or concave portion.

According to the present invention, even though the contact point shape is an ellipse, the gimbal is still unnecessary and the operational function is not deteriorated thereby. In general, as almost e spherical surface of a projecting shape in the present invention, any convex curved surface can be used, under the condition that it has a single contact point with the sliding film 1d and no straight line at its outward line of the contact point shape.

According to the present invention, it is possible that the projecting portion of the slider means has a surface shape of almost a spherical surface. By using the spherical surface as the projecting portion, the slider can be made to stick to the sliding surface of the information storage medium during operation, without using a complicated rotation system such as a gimbal. In this manner, the sliding surface and the slider means can be stably in contact with each other, even though the information storage medium is inclined.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic head assembly for use with an information storage medium having a sliding surface, the magnetic head assembly comprising:

a magnetic-field generation means having a magnetic pole for providing a magnetic field to the information storage medium;

a slider means coupled with the magnetic-field generation means, the slider means having a protruding portion which protrudes toward the information storage medium; and a load means coupled with the slider means, the load means providing a pressing force to the slider means in a direction perpendicular to the sliding surface, and pressing the protruding portion onto the sliding surface so as to maintain continuous sliding contact with the sliding surface during operation, wherein a surface of the protruding portion of the slider means includes part of a spherical surface, and a location of a projection of the bottom surface of the magnetic pole onto the sliding surface, relative to a virtual plane including the bottom surface of the magnetic pole, is outside a contact region on the sliding surface where the protruding portion of the slider means and the sliding surface of the information storage medium can be in contact with each other during operation, and inside a crossing region on the sliding surface where the virtual plane and the sliding surface can cross with each other.

2. A magnetic head assembly according to claim 1, wherein the load means includes:

a fixing part for fixing the load means to a body separated from the information storage medium;

a load generation part for generating the pressing force in a direction substantially perpendicular to the sliding surface; and a rigid part made of a substantially rigid material, wherein the fixing part, the load generation part, the rigid part, and the slider means are connected in this order substantially in series, and a direction from the fixing part to the slider means is substantially parallel to a sliding direction.

3. A magnetic head assembly according to claim 2, wherein the slider means and the rigid part of the load means are integrally formed of the same resin material.

4. A magnetic head assembly according to claim 2, wherein the load generation part of the load means is an elastic body of a substantially flat shape without any external force; and the elastic body is elastically deformed so as to have a convex shape toward the sliding surface of the information storage medium, and coupled between the rigid part and the fixing part of the load means, thereby giving an elastic force of the elastic body to the projecting portion as the pressing force.

5. A magnetic head assembly according to claim 4, wherein the elastic body is a metallic blade spring of a flat-plate shape.

6. A magnetic head assembly according to claim 4, wherein the elastic body includes:

a first attachment part to be attached to the rigid part; and a second attachment part to be attached to the fixing part, wherein a state of the elastic body when giving a standard pressing force to the protruding portion is defined as a standard deformation state, and in the case where an angle formed by a contact plane of the first attachment part and a contact plane of the second attachment part in the standard deformation state is $\theta$, the sliding surface in the standard operation state is defined as a reference plane; and the first attachment part is attached to the rigid part at an angle of approximately $\theta/2$ from the reference plane in the standard operation state, and the second attachment part is attached to the fixing part at an angle of approximately $-\theta/2$ from the reference plane in the standard operation state.

7. A magnetic head assembly according to claim 6, wherein the rigid part and the fixing part are made of a resin material and the elastic body is made of a metallic blade spring of a flat-plate shape;

a rigid-part attachment face of almost a flat plane is provided on the rigid part for fixing the first attachment face, the rigid-part attachment face formed with an angle of approximately $\theta/2$ from the reference plane; a fixed-part attachment face of almost a plan shape is provided on the fixing part for fixing the second attachment face, the fixed-part attachment face formed with an angle of approximately $-\theta/2$ from the reference plane; and the metallic blade springs are respectively attached to the rigid-part attachment face and the fixed-part attachment face by a resin rivet means such as an ultrasonic resin fusion.

8. A magnetic head assembly according to claim 2, wherein the fixing part has a bottom surface being almost parallel to the sliding surface in a standard operation state, the bottom surface facing the sliding surface in the vicinity of the elastic body; and at least in the standard operation state, the first attachment part and the second attachment part are appropriately located so that a point of the elastic body which is closest to the sliding surface does not project from the bottom surface in the side of the fixing part.

9. A magnetic head assembly according to claim 2, wherein the load generation part is a metal spring;

the slider part, the rigid part, and the fixing part are made of a resin material; and the load generation part is formed between the rigid part and the fixing part by insert or outsert forming process.

10. A magnetic head assembly according to claim 2, wherein the load generation part is a spring made of a resin material;

the slider part, the rigid part, and the fixing part are made of a resin material; and the load generation part, the slider part, and the rigid part form an integral structure.

11. A magnetic head assembly according to claim 10, wherein a metal wire is formed in the load generation part by insert or outsert forming process, whereby the metal wire and the load generation part form an integral structure.

12. A magnetic head assembly according to claim 2, wherein the load generation part has a configuration in which a metal wire is formed by insert or outsert forming process in a hinge structure formed of a resin material;

the slider part, the rigid part, and the fixing part are made of a resin material; and the load generation part, the slider part, the rigid part, and the fixing part form an integral structure.

13. A magnetic head assembly according to claim 1, wherein the magnetic pole is provided at a radially outward position of the information storage medium relative to the surface of the protruding portion of the slider means.

14. A magnetic head assembly according to claim 13, wherein a radius of the spherical surface of the protruding portion is approximately 10 mm, and an amount of protruding of the protruding portion is approximately 50 μm; and the magnetic pole is located in a range of approximately 0.4 mm to approximately 1.4 mm along a radial direction of the information storage medium from a peak of the protruding portion on the side of a radially outward position of the information storage medium.

15. A magnetic head assembly according to claim 2, wherein an arm part is extended substantially along a sliding direction from the fixing part, and a hook part is provided on a tip end of the arm part;

the hook part is located between the rigid part and the sliding surface when the protruding portion is in contact with the information storage medium while the magnetic head assembly operates; the hook part does not come into contact with any part excluding the fixing part; and the hook part comes into contact with the rigid part by the pressing force generated by the load generation part while the protruding portion is apart from the sliding surface.

16. A magnetic head assembly according to claim 15, wherein the hook part is formed of a stick or a plate-shaped member which is almost parallel to the sliding surface and extends in a direction substantially perpendicular to a sliding direction.

17. A magnetic head assembly according to claim 1, wherein a location of the slider part is in a limited space which does not include the information storage medium, the space being one of two spaces divided by an inner envelope of a group of planes which is formed by the sliding surface.

18. A magnetic head assembly according to claim 17, wherein when a plane including the sliding surface during operation is denoted as a plane $D_0$, and planes apart from the sliding surface are denoted as planes $D_1$ to $D_n$, respectively depending on a distance of $d_1$ to $d_n$ from the plane $D_0$ to the corresponding plane $D_1$ to $D_n$, and the respective planes $D_1$ to $D_n$ and the part of the spherical surface form crossing lines $C_1$ to $C_n$ as a consequence of fluctuation or inclination of the sliding surface, planes of the slider part each facing the sliding surface are planes $S_1$ to $S_n$ depending on a distance $d_1$ to $d_n$ from the plane $D_0$ and a region $R_1$ to $R_n$ corresponding to each plane Si is limited within the corresponding crossing line Ci.

19. A magnetic head assembly according to claim 1, wherein a contact portion formed when the protruding portion comes into contact with the information storage medium is a single contact region with a boundary which does not include any straight line portions or concave portions.

20. A magnetic head assembly according to claim 1, wherein the protruding portion of the slider means is in contact with the sliding surface of the information storage medium during operation.

21. A magnetic head assembly according to claim 1, wherein the location of the bottom surface of the magnetic pole on the virtual plane is laterally offset from the contact region in a direction parallel with the sliding surface of the information storage medium.

* * * * *